United States Patent [19]

Lynch et al.

[11] Patent Number: 5,616,834
[45] Date of Patent: Apr. 1, 1997

[54] MISFIRE DETECTION DEPENDENT ON INTAKE AIR CHARGE FLUCTUATIONS

[75] Inventors: Marvin L. Lynch, Detroit; Michael A. McClish, Northville; Margaret A. Selfe, Farmington Hills; Gregory Steinl, Royal Oak; Donald J. Remboski, Jr., Dearborn, all of Mich.

[73] Assignee: Motorola Inc., Schaumburg, Ill.

[21] Appl. No.: 591,838

[22] Filed: Jan. 25, 1996

[51] Int. Cl.⁶ .................................. G01M 15/00
[52] U.S. Cl. ............................ 73/116; 73/115; 73/117.3
[58] Field of Search .................. 73/115, 118.2, 73/116, 117.2, 117.3

[56] References Cited

U.S. PATENT DOCUMENTS

| | | | |
|---|---|---|---|
| 4,083,234 | 4/1978 | Aono et al. | 73/116 |
| 5,003,950 | 4/1991 | Kato et al. | 73/118.2 |
| 5,076,098 | 12/1991 | Miwa | 73/115 |
| 5,127,262 | 7/1992 | Demizu et al. | 73/115 |
| 5,321,979 | 6/1994 | McKendry et al. | 73/117.3 |
| 5,351,528 | 10/1994 | Fukui et al. | 73/115 |
| 5,375,462 | 12/1994 | Kuroda et al. | 73/117.3 |
| 5,546,795 | 8/1996 | Yamagishi | 73/118.2 |

*Primary Examiner*—Richard Chilcot
*Assistant Examiner*—George M. Dombroske
*Attorney, Agent, or Firm*—Nicholas C. Hopman

[57] ABSTRACT

A misfire detection system and method measures fluctuations of air charge ingested into an engine 303, preferably as fluctuations of the engine's intake air pressure or as fluctuations of the mass air flow. A misfire indication 337 is provided dependent on a behavior of the fluctuations of air charge. Preferably, to eliminate errors associated with engine transient operating conditions, such as acceleration, the fluctuations of air charge are differentiated 325 before a misfire detection mechanism 333 is used to determine misfire behavior.

18 Claims, 3 Drawing Sheets

MISFIRE DETECTION DEPENDENT ON INTAKE AIR CHARGE FLUCTUATIONS

FIELD OF THE INVENTION

This invention is related to the field of misfire detection within a reciprocating engine, and more specifically to a method, and corresponding apparatus, for determining misfire in a reciprocating engine by interpreting intake air charge fluctuations caused by engine load variations associated with combustion misfire behavior.

BACKGROUND OF THE INVENTION

Contemporary engine misfire detection systems for reciprocating engines apply misfire detection to determine improper combustion. Misfiring causes a loss of power, dumps unburned fuel into a catalytic converter-thereby shortening its life, and causes higher levels of hazardous emissions. The need to identify whether a misfire has occurred is a strict requirement of current government regulation.

One approach of current misfire detection systems is to use a measure of a deviation away from an expected crankshaft velocity or acceleration. Many of these systems are effective but needlessly complex. To meet the regulations these systems must process engine crankshaft position data at very high data rates. This requirement puts a significant demand on associated signal processing circuitry which makes it complex. Furthermore, to effectively implement this approach, the engine crankshaft position must be sensed at a fairly high resolution. This requires a significant investment in tooling of mechanical engine parts to enable measurement of engine crankshaft position at high resolutions.

Another scheme monitors deviations in exhaust pressure and analyzes the resulting harmonic spectra from an engine via the engine's exhaust system. Sensor durability is a major factor in these systems because of the vexed hostile environment in the exhaust system. Furthermore, this scheme's accuracy is substantially dependent on the characteristics of the coupling medium, in this case the exhaust system. The exhaust system, includes an exhaust manifold, coupled to an exhaust tube that is coupled to a catalytic converter, that is coupled to a muffler, that is coupled to an exhaust pipe. Because of this structure, this arrangement is susceptible to interference from non-engine performance related audio noise sources including engine and vehicle vibrations that are coupled into the exhaust system. A resonance of this coupling medium may add to the harmonic spectra provided by the engine. Also, because of its large volumetric size, the exhaust system acts like a lowpass filter that reduces the available signal thus effecting the accuracy of the measurement. Additionally, the propagation time of audio output from the engine will change as the exhaust system heats up or cools down. Also, the length that the individual cylinder audio output traverses varies with each cylinder because of the different exhaust runner lengths of the exhaust manifold. This will cause a variable delay from when the exhaust valve opens to when it is sensed. This variable length coupling from each cylinder to the sensory means may also shift the harmonic spectra provided by the engine. This is because of the pressure wave reflections that are caused by the different amount of time a pressure pulse will take to travel from an exhaust valve to the audio sensor in different cylinders.

What is needed is an improved approach for misfire detection for engines with relatively low complexity that is insensitive to inaccuracies of the prior art approaches.

DETAILED DESCRIPTION OF A PREFERRED EMBODIMENT

A misfire detection system and method measures fluctuations of air charge into an engine. These fluctuations can be measured as changes in intake air pressure, changes in intake mass flow rate, or any equivalent measure. A misfire indication is provided dependent on the behavior of these fluctuations. Preferably, to eliminate errors associated with engine transient operating conditions such as those caused during engine acceleration, the fluctuations of air charge are processed before a misfire detection mechanism evaluates the fluctuations.

This novel approach uses a measure of intake air charge fluctuations to detect misfire. An engine's intake manifold pressure behaves in a manner inversely proportional to engine crankshaft velocity and to mass of air charge inducted on a given engine cycle. In the preferred embodiment an intake manifold pressure signal is differentiated to obtain a signal related to the engine's crankshaft acceleration and air mass inducted. The differentiated signal is then processed to remove spectral noise components before a misfire determination process. This approach is particularly attractive for systems that already use intake manifold pressure or mass air flow sensors for engine control because no additional sensors are required.

Figure 1:
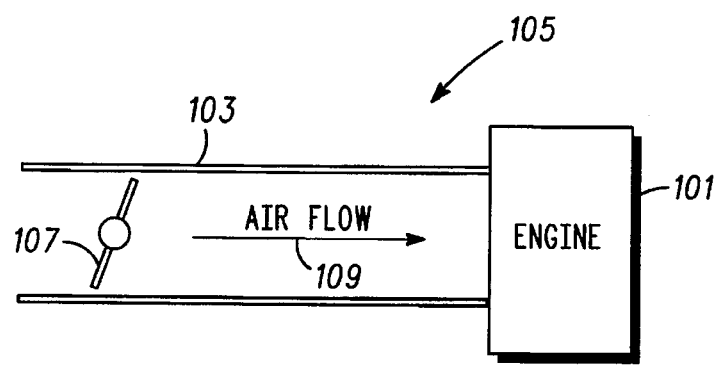
FIG. 1 is a system block diagram of an engine air intake system.

FIG. 1 is a system block diagram of an engine air intake system. An engine 101 is fed atmospheric pressure air 105 through an air intake plenum 103. The atmospheric pressure air 105 is regulated into the air intake plenum 103 by a throttle plate 107. Pressure, or alternatively mass flow of the air flow 109 in the air intake plenum 103, is dependent on a pressure difference created across the air intake plenum 103 between the atmospheric pressure air 105 and the engine 101. As the engine operates, the pressure or mass of the air flow 109 changes depending on a pumping action created by intake strokes of cylinders of the engine 101. Behavior of the pumping action, thereby the pressure or mass of the air flow 109, is also dependent on mechanical torque caused by cylinders exclusive of the air intake process. Next, an example of fluctuations of air charge into the engine 101 will be characterized in graphical form.

Figure 2:
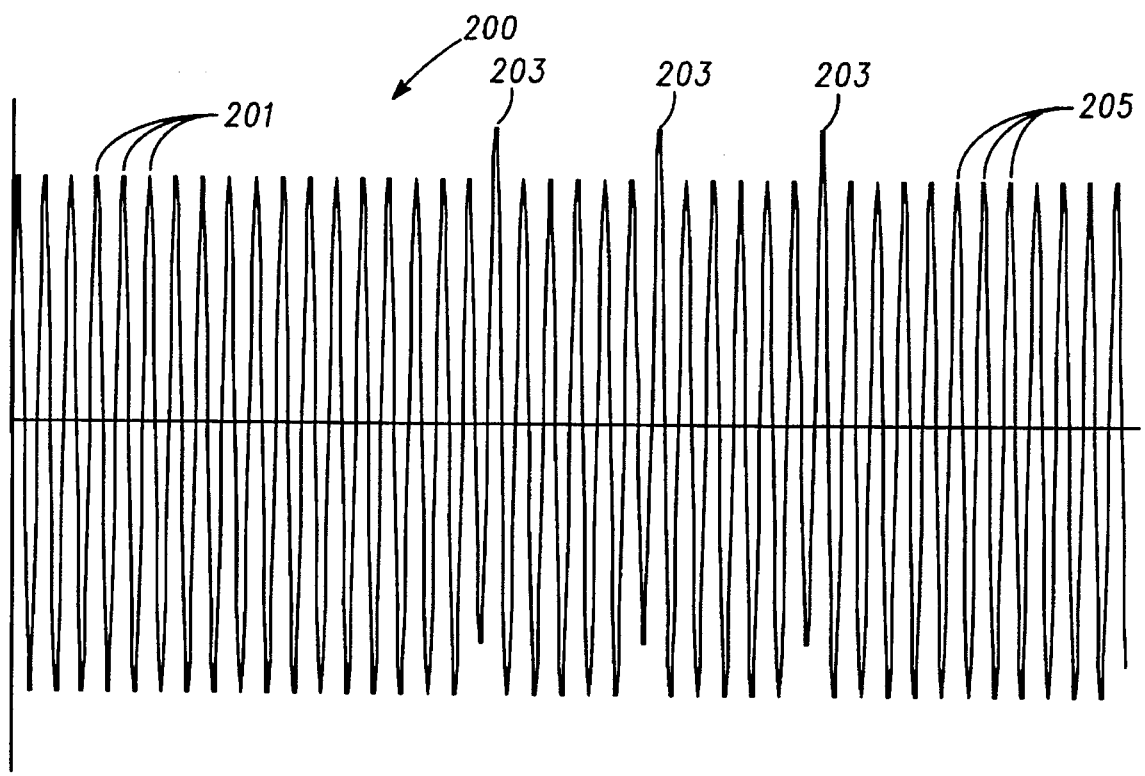
FIG. 2 is a chart illustrating a measure of engine intake air charge fluctuations.

FIG. 2 is a chart illustrating a measure of engine intake air charge 200. With a properly operating engine, the intake air charge 200 behaves in a pulsating type manner as shown at reference number 201. As the intake air charge decreases, the waveform 200 decreases in a negative-going direction. This negative-going transition is indicative of an intake valve opening and the respective engine's cylinder sucking in the air charge via the intake valve. As the intake valve closes, and the sucking of the intake air charge slows down, the intake pressure increases, or the mass air flow decreases 200. If a disturbance to the mechanical torque of the engine occurs, which can be caused by a misfiring cylinder, the pressure of the intake air charge changes. Furthermore, when a misfire occurs, the mass of gas inducted into the cylinder reduces from that of a normally firing cylinder. Both of these effects cause a slight increase in intake pressure related to the misfiring cylinder as shown in reference number 203. Later, as the engine stabilizes and begins operating normally again, the pressure and mass flow returns to their earlier value as shown at reference number 205.

In the preferred embodiment, the illustrated behavioral change of the intake air charge waveform 200 is measured and analyzed to predict torque variations of the engine associated with a misfiring cylinder. The described system produces an output signal whose primary signal frequency is based on the misfire rate (i.e. one indication per misfire event). Next, a system block diagram will be introduced.

Figure 3:
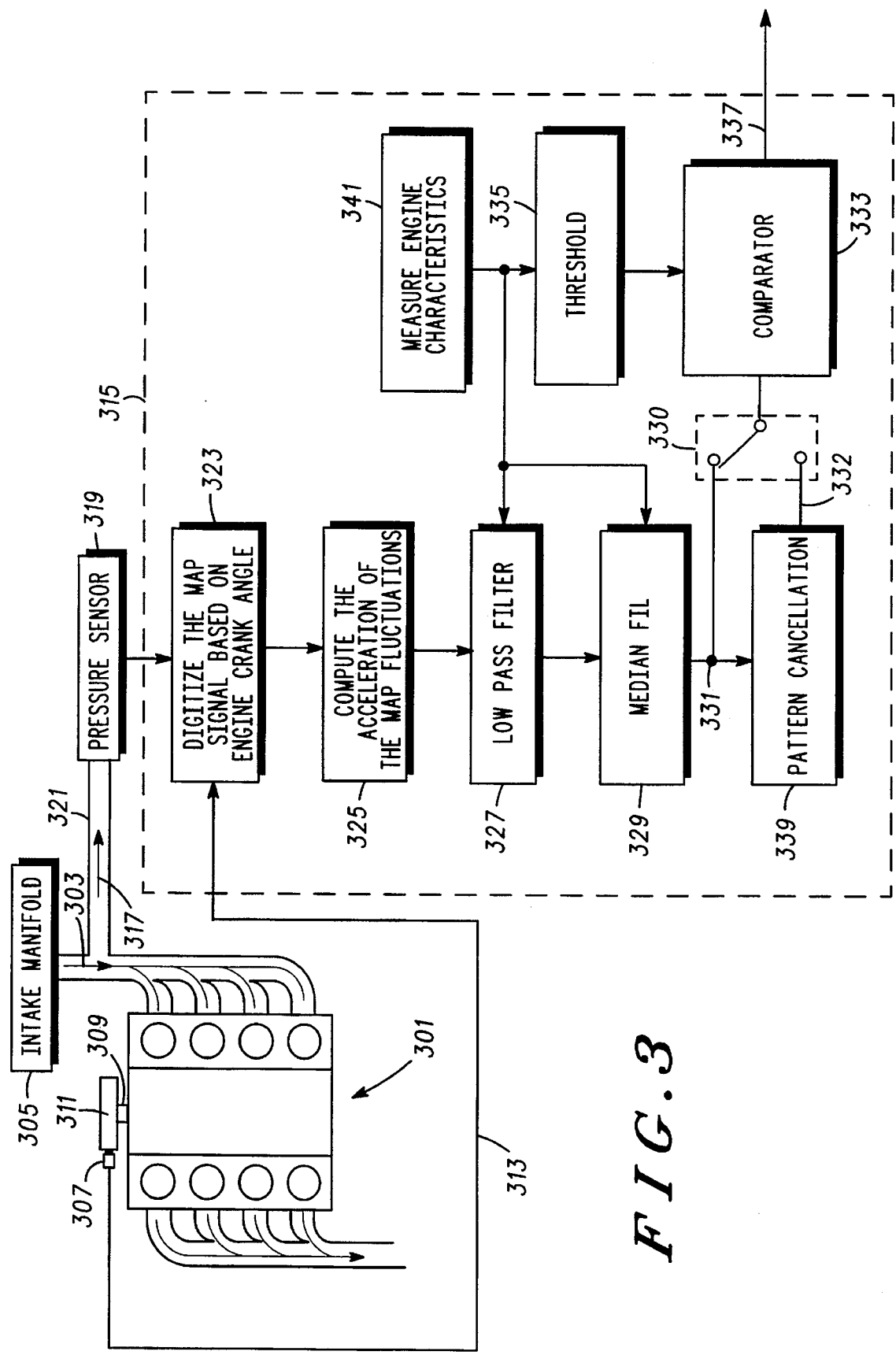
FIG. 3 is a system block diagram in accordance with a preferred embodiment of the invention.

FIG. 3 is an overall system block diagram that illustrates certain aspects of the improved approach described herein. An engine 301 is fed an intake air charge 303 through an intake manifold 305.

An engine speed sensor 307 monitors a crankshaft 309 connected to a position wheel 311. These components 307, 309 and 311 produce a signal 313 indicative of the engine's rotational position. The engine's rotational position signal 313 is used to schedule operation of a controller 315. A portion 317 of the intake air charge 303 is diverted to a pressure sensor 319. Preferably, the pressure sensor 319 is a Motorola PRT (Piezo-Resistive Transducer) pressure sensor. A coupling 321 between the intake manifold 305, associated runner system, and the pressure sensor 319 has a geometry designed to minimize potentially harmful resonant effects (e.g. keep the hose diameter large and the hose length short).

The controller 315 is preferable constructed using a Motorola 68332 microcontroller. The Motorola 68332 microcontroller is particularly suited to the task at hand because it has computational abilities commensurate with processing the required intake air charge and engine position information. Those skilled in the art will recognize other equivalent microcontroller platforms capable of executing the preferred method described herein. Alternatively, the controller 315 could be replaced by analog or digital hardware to perform the same function.

The blocks 323–337 positioned within the boundaries of the controller 315 are microcoded signal processing steps that are programmed as operating instructions in the controller 315. In a first processing step 323, the controller 315 digitizes a signal provided by the pressure sensor 319 in accordance with a schedule invoked dependent upon the engine crankshaft position determined by the engine's rotational position signal 313. In the preferred embodiment this digitized signal is an air pressure signal. Alternatively, the signal can be a measure of mass air flow if the pressure sensor 319 is replaced by a mass air flow sensor. Preferably, the portion 317 of the intake air charge 303 is sampled every 18 engine crankshaft degrees. This relatively low resolution scheduling plan is a significant advantage over prior art systems which require high resolution measurement.

Next, in processing step 325 an intake air fluctuation signal, is determined dependent on the intake air pressure by a differentiation process. This differentiation process removes any effects of engine transient operating conditions such as engine acceleration and engine deceleration.

Next, the differentiated air pressure fluctuations are processed to eliminate various sources of noise. This must be done before misfire behavior can be accurately detected. Fluctuation behavior caused by normal combustion torque needs to be removed. The signal processing for this is done in two separate operations. First, the differentiated air pressure fluctuations are processed through a lowpass filter 327 to remove any high-order spectral behavior associated primarily with normal combustion torque.

Then, the lowpass filtered differentiated air pressure fluctuations are processed through a median filter 329 to remove any low-order spectral behavior. Low-order spectral behavior can be characteristic of engine driveline disturbances caused by rough road conditions and other causes. Next, a lowpass-median filtered differentiated air pressure fluctuation signal 331 is produced.

Preferably, the lowpass and median filtering is done dependent on at least one engine characteristic selected from a group of engine characteristics consisting of engine speed, engine load, and engine temperature. The engine characteristics of engine speed, engine load, and engine temperature are measured by conventional techniques in block 341.

Next, the lowpass-median filtered differentiated air pressure fluctuation signal 331 indicative of is fed into a comparator 333. The comparator 333 compares the lowpass-median filtered differentiated air pressure fluctuation signal 331 to a threshold 335 and provides a misfire detection signal 337 when the lowpass-median filtered differentiated air pressure fluctuation signal 331 exceeds the threshold 335. Preferably, the threshold 335 is determined dependent on at least one engine characteristic selected from a group of engine characteristics consisting of engine speed, engine load, and engine temperature as determined in block 341 described earlier.

Note that other noise related behaviors that can manifest themselves within a spectrum of one-half to one cycle per engine crankshaft revolution includes a first-order effect of crankshaft twist, induced by reciprocating inertia torque, piston mass imbalance, and combustion imbalance between cylinders. All of these behaviors can seriously effect the accuracy of the misfire determination process. A pattern cancellation block 339 can significantly remove these behaviors from the lowpass-median filtered differentiated air pressure fluctuation signal 331 by filtering out these behaviors. This pattern cancellation can be accomplished by sampling the lowpass-median filtered differentiated air pressure fluctuation signal 331 over a first period of engine crankshaft rotation to provide a first data point, sampling the lowpass-median filtered differentiated air pressure fluctuation signal 331 over a second period of engine crankshaft rotation to provide a second data point, and sampling the lowpass-median filtered differentiated air pressure fluctuation signal 331 over a third period of engine crankshaft rotation to provide a third data point. Then, an average of the first and third data points is subtracted from the second data point and a pattern canceled lowpass-median filtered differentiated air pressure fluctuation signal 332 which is significantly absent first-order effects can be produced.

Figure 4:
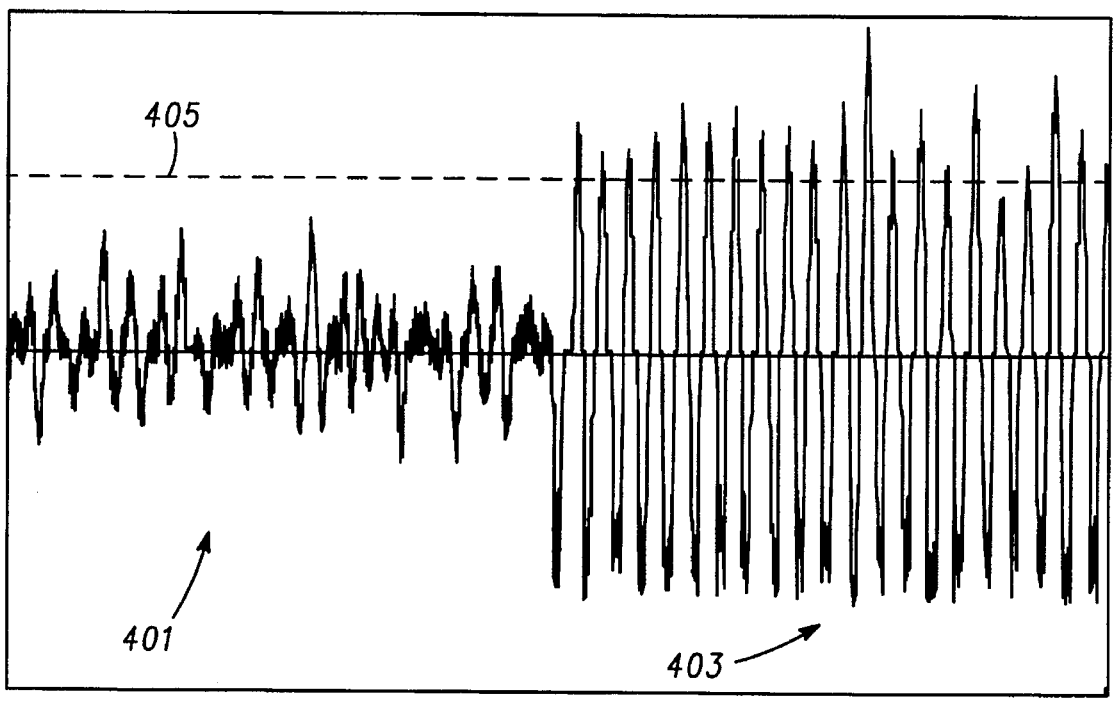
FIG. 4 is a chart showing a measure of engine performance dependent on engine ingested air charge fluctuations after signal processing to remove unwanted noise.

An example of the pattern canceled lowpass-median filtered differentiated air pressure fluctuation signal 332 is shown in FIG. 4. A first portion 401 represents multiple normal firing combustion events, and a second portion 403 indicates multiple misfiring combustion events, where the misfiring has been induced for demonstration purposes. The dashed line 405 is representative of the threshold 331 (in graphical form) mentioned earlier in FIG. 3. Notice that the misfiring portion 403 of the pattern canceled lowpass-median filtered differentiated air pressure fluctuation signal 332 clearly crosses the threshold 405 while the normal firing portion 401 of the pattern canceled lowpass-median filtered differentiated air pressure fluctuation signal 332 quite clearly does not cross the threshold 405. This separation of the pattern canceled lowpass-median filtered differentiated air pressure fluctuation signal 332 between the normal firing portion 401 and the misfiring portion 403 is preferable in any high accuracy misfire detection system such as the one described here.

Returning to FIG. 3 the pattern canceled lowpass-median filtered differentiated air pressure fluctuation signal 332 is alternatively fed into the comparator 333 via a selector 330. In this case, when the pattern canceled lowpass-median filtered differentiated air pressure fluctuation signal 332 exceeds the threshold 335, a misfire detection signal 337 can be provided. The action of the selector is dependent on various engine operating conditions.

In conclusion an improved approach for misfire detection has been described above. This approach can be implemented with relatively low complexity because it does not require a high resolution engine position encoding scheme as prior art systems to achieve a high accuracy misfire detection systems. The described approach can take advantage of existing sensors. This not only eliminates complexity associated with high resolution engine position encoders but also eliminates the cost and complexity of hard tooling mechanical components. Furthermore, signal processing bandwidth of the post processing elements 325, 327, 329, and 339 can be relaxed compared to high resolution engine position encoder based misfire detection systems.

What is claimed is:

1. A misfire detection method for an engine comprising:
   measuring fluctuations of air charge ingested into the engine; and
   providing a misfire indication dependent on the measured fluctuations of air charge.

2. A misfire detection method in accordance with claim 1 wherein the step of measuring fluctuations of air charge ingested into the engine comprises a step of measuring fluctuations of air pressure ingested into the engine.

3. A misfire detection method in accordance with claim 2 further comprising a step of:
   converting the measured fluctuations of air pressure ingested into the engine into differentiated air pressure fluctuations; and
   wherein the step of providing a misfire indication, provides a misfire indication dependent on the differentiated air pressure fluctuations.

4. A misfire detection method in accordance with claim 3 further comprising a step of:
   filtering the differentiated air pressure fluctuations dependent on at least one engine characteristic selected from a group of engine characteristics consisting of engine speed, engine load, and engine temperature, and providing filtered differentiated air pressure fluctuations dependent thereon; and wherein the step of providing a misfire indication, provides a misfire indication dependent on a magnitude of the filtered differentiated air pressure fluctuations.

5. A misfire detection method in accordance with claim 1 wherein the step of measuring fluctuations of air charge ingested into the engine comprises a step of measuring fluctuations of mass air flow ingested into the engine.

6. A misfire detection method in accordance with claim 5 further comprising a step of:
   converting the measured fluctuations of mass air flow ingested into the engine into differentiated mass air flow fluctuations; and
   wherein the step of providing a misfire indication, provides a misfire indication dependent on the differentiated mass air flow fluctuations.

7. A misfire detection method in accordance with claim 6 further comprising a step of:
   filtering the differentiated mass air flow fluctuations dependent on at least one engine characteristic selected from a group of engine characteristics consisting of engine speed, engine load, and engine temperature, and providing filtered differentiated mass air flow fluctuations dependent thereon; and
   wherein the step of providing a misfire indication, provides a misfire indication dependent on a magnitude of the filtered differentiated mass air flow fluctuations.

8. A misfire detection method in accordance with claim 1 further comprising a step of:
   measuring a position of an intake manifold damper; and
   wherein the step of providing a misfire indication, provides a misfire indication dependent on the measured position of the intake manifold damper.

9. A misfire detection method in accordance with claim 1 further comprising a step of:
   establishing a misfire threshold dependent on at least one engine characteristic selected from a group of engine characteristics consisting of engine speed, engine load, and engine temperature; and wherein the step of providing a misfire indication provides a misfire indication when a magnitude of a derivative of the fluctuations of air charge ingested into the engine exceeds the established misfire threshold.

10. A misfire detection method for an engine comprising:
    measuring engine crankshaft angular position;
    providing a measure of intake air pressure scheduled in cooperation with the measured engine crankshaft angular position;
    differentiating the measure of intake air pressure into differentiated intake air signal; and
    providing a misfire indication dependent on the differentiated intake air signal.

11. A misfire detection method in accordance with claim 10 further comprising a step of:
    filtering the differentiated intake air signal dependent on at least one engine characteristic selected from a group of engine characteristics consisting of engine speed, engine load, and engine temperature, and providing a filtered differentiated intake air signal dependent thereon; and
    wherein the step of providing a misfire indication, provides a misfire indication dependent on the filtered differentiated intake air signal.

12. A misfire detection method in accordance with claim 10 further comprising a step of:
    measuring a position of an intake manifold damper; and
    wherein the step of providing a misfire indication, provides a misfire indication dependent on the measured position of the damper.

13. A misfire detection method in accordance with claim 10 further comprising a step of:
    establishing a misfire threshold dependent on at least one engine characteristic selected from a group of engine characteristics consisting of engine speed, engine load, and engine temperature; and
    wherein the step of providing a misfire indication, provides a misfire indication dependent on the established misfire threshold.

14. A misfire detection system for an engine comprising:

a sensor coupled to the engine for providing measuring fluctuations of air charge ingested into the engine; and a signal processor for providing a misfire indication dependent on a magnitude of the fluctuations of air charge ingested into the engine.

15. A misfire detection system in accordance with claim 14 wherein the signal processor comprises:

a differentiator for receiving the fluctuations of air charge ingested into the engine and for providing a differentiated air charge signal dependent thereon; and a comparator for receiving the differentiated air charge signal and providing a misfire indication when the differentiated air charge exceeds a threshold.

16. A misfire detection system in accordance with claim 14 wherein the signal processor comprises:

a differentiator for receiving the fluctuations of air charge ingested into the engine and for providing a differentiated air charge signal dependent thereon;

a lowpass filter for receiving the differentiated air charge signal and for providing a lowpass filtered differentiated air charge signal dependent thereon;

a median filter for receiving the lowpass filtered differentiated air charge signal and for providing a median-lowpass filtered differentiated air charge signal dependent thereon; and a comparator for receiving the median-lowpass filtered differentiated air charge signal and providing a misfire indication when the median-lowpass filtered differentiated air charge signal exceeds a misfire threshold.

17. A misfire detection system in accordance with claim 16 further comprising:

a pattern canceler for receiving the median-lowpass filtered differentiated air charge signal and providing a pattern canceled median-lowpass filtered differentiated air charge signal dependent thereon; and wherein the comparator receives the pattern canceled median-lowpass filtered differentiated air charge signal and provides a misfire indication when the pattern canceled median-lowpass filtered differentiated air charge signal exceeds a threshold.

18. A misfire detection system in accordance with claim 14 wherein the misfire threshold is set dependent on a measurement of at least one engine characteristic selected from a group of engine characteristics consisting of engine speed, engine load, and engine temperature; and wherein the comparator provides a misfire indication when the magnitude of the median-lowpass filtered differentiated air charge exceeds the misfire threshold.

\* \* \* \* \*